United States Patent
Gurbag et al.

(10) Patent No.: US 9,467,486 B2
(45) Date of Patent: Oct. 11, 2016

(54) CAPTURING AND ANALYZING USER ACTIVITY DURING A MULTI-USER VIDEO CHAT SESSION

(71) Applicant: SAMSUNG ELECTRONICS CO., LTD., Suwon, Gyeonggi-Do (KR)

(72) Inventors: Can Gurbag, Irvine, CA (US); Esther Zheng, Irvine, CA (US); Jason Meachum, Mission Viejo, CA (US); Michael Bringle, Irvine, CA (US); Naiqi Jin, Santa Ana, CA (US); Praveen Kashyap, Irvine, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 101 days.

(21) Appl. No.: 13/841,494

(22) Filed: Mar. 15, 2013

(65) Prior Publication Data
US 2014/0282111 A1 Sep. 18, 2014

(51) Int. Cl.
G06F 3/00 (2006.01)
H04L 29/06 (2006.01)
H04L 29/08 (2006.01)

(52) U.S. Cl.
CPC .......... *H04L 65/403* (2013.01); *H04L 65/601* (2013.01); *H04L 67/22* (2013.01)

(58) Field of Classification Search
CPC .................... H04N 7/15; H04N 21/44008
USPC .................................................. 715/756, 759
See application file for complete search history.

(56) References Cited

U.S. PATENT DOCUMENTS

| | | | |
|---|---|---|---|
| 6,721,454 B1 | 4/2004 | Qian et al. | |
| 2004/0230651 A1* | 11/2004 | Ivashin | 709/204 |
| 2005/0099492 A1* | 5/2005 | Orr | 348/14.08 |
| 2005/0131697 A1* | 6/2005 | Brown et al. | 704/270 |
| 2008/0034085 A1* | 2/2008 | Chawla et al. | 709/224 |
| 2008/0307324 A1* | 12/2008 | Westen | G06F 3/0486 715/753 |
| 2008/0320082 A1* | 12/2008 | Kuhlke et al. | 709/205 |
| 2009/0287790 A1* | 11/2009 | Upton | H04L 12/1827 709/208 |
| 2009/0328122 A1 | 12/2009 | Amento et al. | |
| 2010/0153497 A1 | 6/2010 | Sylvain et al. | |

(Continued)

FOREIGN PATENT DOCUMENTS

WO 2012046425 A1 4/2012
WO 2012177574 A2 12/2012

OTHER PUBLICATIONS

Anonyomous, "Google Hangouts", May 15, 2013, Wikipedia, pp. 1-5, Google, United States [retrieve from https://en.wikipedia.org/w/index.php?title=Google_Hangouts&redirect=no on Mar. 12, 2015].

(Continued)

*Primary Examiner* — Omar Abdul-Ali
(74) *Attorney, Agent, or Firm* — Sherman IP LLP; Kenneth L. Sherman; Hemavathy Perumal

(57) ABSTRACT

A system for facilitating a multi-user video chat session, wherein the system comprises multiple electronic client devices and a server. The server receives, from each client device, an information unit representing user activity at the client device. The server selects one or more information units based on measurements of user activity in the information units received. The server generates a combined video stream including said selected one or more information units, wherein the combined video stream is sent to at least one client device.

27 Claims, 11 Drawing Sheets

(56) References Cited

U.S. PATENT DOCUMENTS

| | | | |
|---|---|---|---|
| 2011/0196918 A1* | 8/2011 | Kkunigita | H04N 5/76 709/203 |
| 2011/0238754 A1 | 9/2011 | Dasilva et al. | |
| 2011/0249081 A1* | 10/2011 | Kay et al. | 348/14.03 |
| 2011/0267422 A1* | 11/2011 | Garcia et al. | 348/14.16 |
| 2011/0295392 A1 | 12/2011 | Cunnington et al. | |
| 2013/0110565 A1* | 5/2013 | Means, Jr. | G06Q 10/063 705/7.11 |
| 2014/0067455 A1* | 3/2014 | Zhang et al. | 705/7.24 |
| 2014/0085399 A1* | 3/2014 | Modai | H04L 65/403 348/14.01 |

OTHER PUBLICATIONS

Jiang, W. et al., "Audio-Visual Grouplet: Temporal Audio-Visual Interactions for General Video Concept Classification", Proceedings of the 19th ACM International Conference on Multimedia (MM'11), Nov. 28, 2011, pp. 123-132, ACM, United States.

European Search Report dated Mar. 2, 2015 for European Application No. 14154356.1 from European Patent Office, pp. 1-9, Munich, Germany.

European Examination Report dated Jun. 30, 2016 for European Application No. 14154356.1 from European Patent Office, pp. 1-5, Berlin, Germany.

* cited by examiner

US 9,467,486 B2

CAPTURING AND ANALYZING USER ACTIVITY DURING A MULTI-USER VIDEO CHAT SESSION

TECHNICAL FIELD

One or more embodiments relate generally to multi-user video chatting, and in particular to capturing and analyzing user activity during a multi-user video chat session.

BACKGROUND

A multi-user video chat system enables video chatting between multiple users. A video chat system enables a user participating in a video chat session to transmit live or semi-live video of the user to other users involved in the video chat session. Video chats are typically conducted via an electronic device such as a computer, a laptop, a tablet or a phone, and may involve point-to-point (i.e., one-to-one) interaction or multipoint (i.e., one-to-many) interaction.

SUMMARY

One embodiment provides a system for facilitating a multi-user video chat session, wherein the system comprises multiple electronic client devices and a server. The server receives, from each client device, an information unit representing user activity at the client device. Each information unit received from each client device comprises a video stream capturing user activity at the client device. The server selects one or more information units based on measurements of user activity in the information units received. The server generates a combined video stream including the selected one or more information units, wherein the combined video stream is sent to at least one client device.

One embodiment provides a method for facilitating a multi-user video chat session. The method comprises receiving information units from multiple client devices, wherein each information unit represents user activity at a client device. Each information unit received from each client device comprises a video stream capturing user activity at the client device. One or more information units are selected based on measurements of user activity in the information units received. A combined video stream including the selected one or more information units is generated, wherein the combined video stream is sent to at least one client device.

One embodiment provides a non-transitory computer-readable medium having instructions which when executed on a computer perform a method for facilitating a multi-user video chat session. The method comprises receiving information units from multiple client devices, wherein each information unit represents user activity at a client device. Each information unit received from each client device comprises a video stream capturing user activity at the client device. One or more information units are selected based on measurements of user activity in the information units received. A combined video stream including the selected one or more information units is generated, wherein the combined video stream is sent to at least one client device.

One embodiment provides an electronic device for facilitating a multi-user video chat session. The electronic device comprises a display configured to display a piece of content, a camera configured to capture a video stream of user activity during playback of the piece of content, and a graphical user interface (GUI) application module. The GUI module is configured to receive a combined video stream including at least one video stream of user activity at a different electronic device, and generate a GUI comprising at least one video chat window. Each video chat window includes a video stream of user activity at a different electronic device. The display is further configured to simultaneously display the piece of content and the GUI generated.

One embodiment provides a graphical user interface (GUI) displayed on a display of an electronic client device. The GUI comprises a first window for displaying a piece of content, and a video chat interface for facilitating a multi-user video chat session during playback of the piece of content.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

Figure 1:
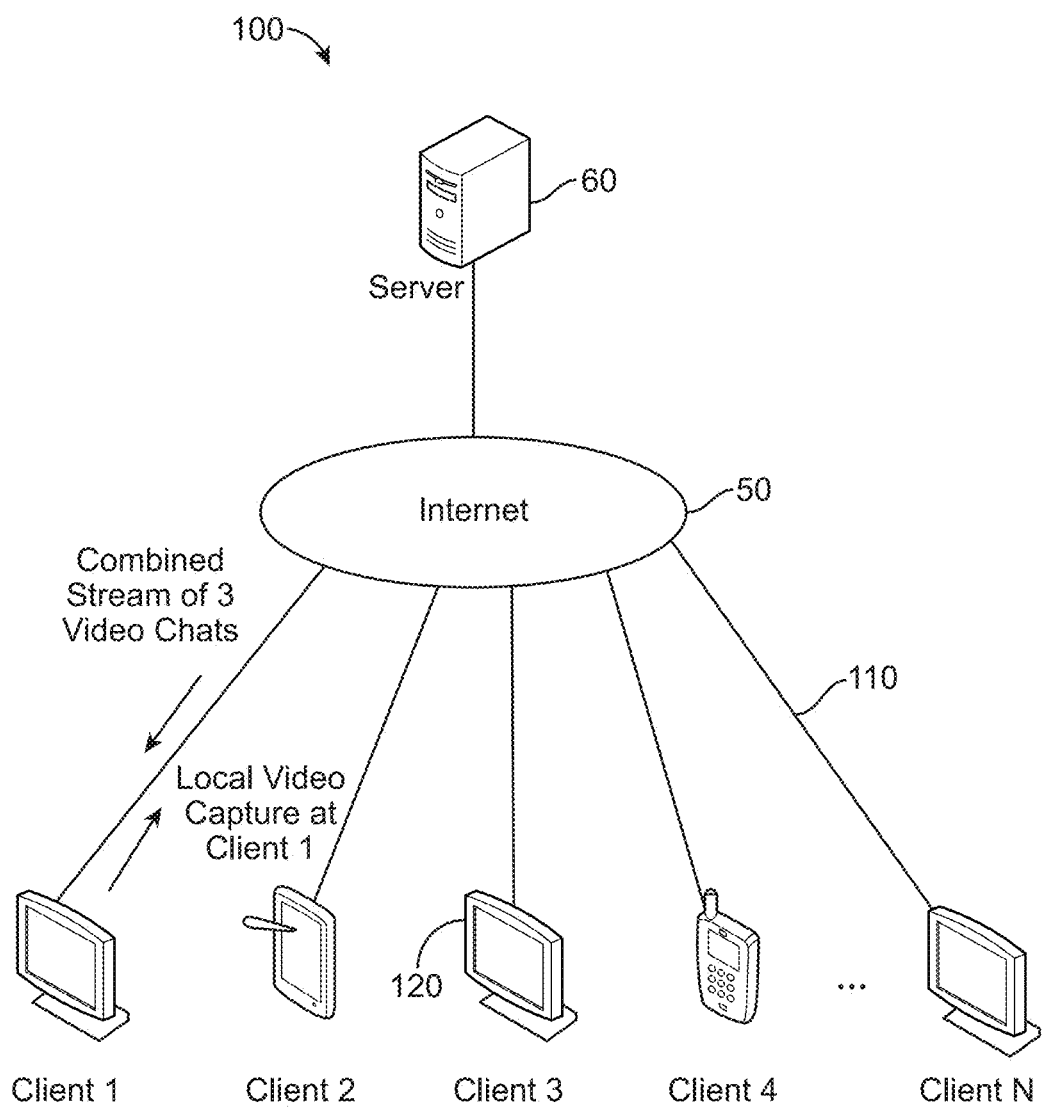
FIG. 1 illustrates an example architecture for a system for capturing and analyzing user activity, in accordance with an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to multi-user video chatting, and in particular to capturing and analyzing user activity during a multi-user video chat session. One embodiment provides a system for facilitating a multi-user video chat session, wherein the system comprises multiple electronic client devices and a server. The server receives, from each client device, an information unit representing user activity at the client device. Each information unit received from each client device comprises a video stream capturing user activity at the client device. The server selects one or more information units based on measurements of user activity in the information units received. The server generates a combined video stream including the selected one or more information units, wherein the combined video stream is sent to at least one client device.

One embodiment provides a method for facilitating a multi-user video chat session. The method comprises receiving information units from multiple client devices, wherein each information unit represents user activity at a client device. Each information unit received from each client device comprises a video stream capturing user activity at the client device. One or more information units are selected based on measurements of user activity in the information units received. A combined video stream including the selected one or more information units is generated, wherein the combined video stream is sent to at least one client device.

One embodiment provides a non-transitory computer-readable medium having instructions which when executed on a computer perform a method for facilitating a multi-user video chat session. The method comprises receiving information units from multiple client devices, wherein each information unit represents user activity at a client device. Each information unit received from each client device comprises a video stream capturing user activity at the client device. One or more information units are selected based on measurements of user activity in the information units received. A combined video stream including the selected one or more information units is generated, wherein the combined video stream is sent to at least one client device.

In one embodiment, each client device receives the same combined video stream from the server. In another embodiment, the server is further configured to receive, from each client device, user preferences for the client device, wherein the server generates a combined video stream for the client device based on the user preferences for the client device.

In one embodiment, the server is further configured to for each video stream received, measure user activity captured in the video stream. In another embodiment, the server is further configured to receive, from each client device, a measurement of user activity captured at the client device.

In one embodiment, the selected one or more information units includes a video stream with the highest measurement of user activity.

One embodiment provides an electronic device for facilitating a multi-user video chat session. The electronic device comprises a display configured to display a piece of content, a camera configured to capture a video stream of user activity during playback of the piece of content, and a graphical user interface (GUI) application module. The GUI module is configured to receive a combined video stream including at least one video stream of user activity at a different electronic device, and generate a GUI comprising at least one video chat window. Each video chat window includes a video stream of user activity at a different electronic device. The display is further configured to simultaneously display the piece of content and the GUI generated.

The electronic device receives the combined video stream from a server. The electronic device sends the video stream of user activity captured by the camera to the server.

The electronic device further comprises a user interest measurement application module for measuring user interest of the piece of content based on a measurement of user activity, wherein the electronic device sends data relating to the measured user interest to the server.

The electronic device further comprises a reaction capture application module for detecting and recording a user reaction during playback of the piece of content. The recorded user reaction is sent to at least one of: the server, and a social networking site.

In one embodiment, the electronic device sends user preferences to the server, and the combined video stream received from the server is based on the user preferences.

One embodiment provides a graphical user interface (GUI) displayed on a display of an electronic client device. The GUI comprises a first window for displaying a piece of content, and a video chat interface for facilitating a multi-user video chat session during playback of the piece of content.

The video chat interface includes at least one video chat window. Each video chat window includes a video stream of user activity captured at a different client device.

In one embodiment, the number of video chat windows displayed is based on user preferences. In one embodiment, the number of video chat windows displayed is based on capabilities of the client device.

These and other aspects and advantages of one or more embodiments will become apparent from the following detailed description, which, when taken in conjunction with the drawings, illustrate by way of example the principles of one or more embodiments.

FIG. 1 illustrates an example architecture for a system 100 for capturing and analyzing user activity, in accordance with an embodiment.

In one embodiment, the system 100 comprises at least one client device 120. As shown in FIG. 1, the system 100 comprises multiple client devices 120, such as Client 1, Client 2, Client 3, Client 4, . . . , and Client N, wherein N is an integer greater than 1. A client device 120 may be an electronic device such as an appliance, a personal computer (PC), a television (TV) such as a smart TV, or a mobile device (e.g., a mobile phone such as a smart phone, a laptop computer).

In one embodiment, each client device 120 can play back different types of content, including audio and video such as television programs, movies, and advertisements. Each client device 120 includes a display 122 (FIG. 2A) for displaying content. A client device 120 may receive content for playback from one or more content distributors, such as a content provider (e.g., a television cable company), a content creator (e.g., a video podcaster), or an advertiser.

Each client device 120 further includes a camera component 131 (FIG. 2A) for capturing/recording videos and/or images. In one embodiment, the camera module 131 is integrated with the client device 120. In another embodiment, the camera module 131 is a separate client device 120. As described in detail later herein, the system 100 uses the camera module 131 to capture user activity data, such as the facial expressions (e.g., laughter, crying) and the body movements (e.g., jumping) of one or more users viewing content playing on the client device 120.

In one embodiment, the system 100 further comprises a microphone module 132 (FIG. 2A) for capturing (e.g., recording) audio (i.e., sound) from the area surrounding the client device 120. In one embodiment, the microphone module 132 is integrated with the client device 120. In another embodiment, the microphone module 132 is a separate client device 120.

As described in detail later herein, the system 100 uses the microphone module 132 to capture user activity data, such as the words spoken by one or more users viewing content playing on the client device 120. The audio captured by the microphone module 132 may also be used to determine context data, such as the noise levels of the ambient environment (e.g., how noisy is the room where the client device 120 is situated).

Each client device 120 may establish a connection 110 to an external network, such as the Internet 50. A connection 110 may be a wireless connection, a wired connection, or a combination of the two.

The system 100 further comprises a server unit 60 that is connected to the Internet 50 over a connection 110.

A user operating a client device 120 may participate in a group video chat (i.e., video conference) while watching content playing on the client device 120. The server unit 60 is configured to facilitate a group video chat between multiple client devices 120. Each client device 120 participating in a group video chat sends a captured video stream and/or images to the server unit 60 via the Internet 50, and simultaneously receives a video stream from the server unit 60 via the Internet 50.

The server unit 60 receives an individual video stream from each client device 120 participating in a group video chat. For each participating client device 120, the server unit 60 selects a subset of video streams from the video streams received, generates a combined video stream that includes the selected subset of video streams, and sends the combined video stream to the participating client device 120. In one embodiment, each participating client device 120 receives the same combined video stream. In another embodiment, each participating client device 120 receives a different combined video stream.

Figure 2A:
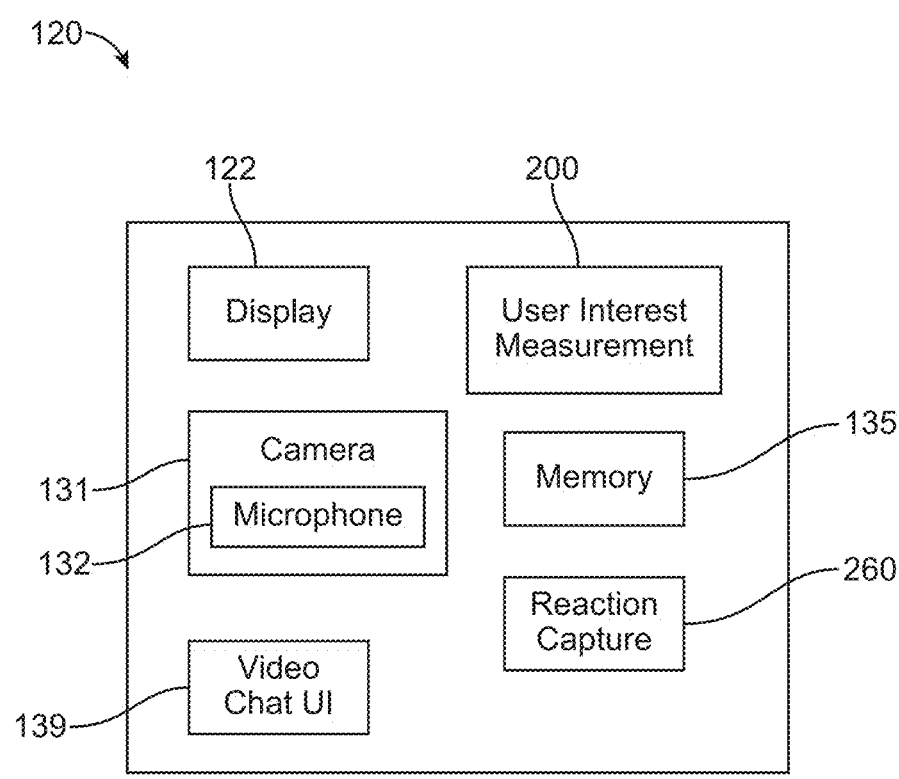
FIG. 2A illustrates an example block diagram of a client device, in accordance with an embodiment.

FIG. 2A illustrates an example block diagram of a client device 120, in accordance with an embodiment. The client device 120 further comprises a user interest measurement application module 200 for measuring user interest of content playing on the client device 120, a memory unit 135 for storing data (e.g., locally captured video), a reaction capture application module 260 for recording and saving portions of the captured video stream indicating high user interest, and a video chat user interface application module 139 for generating a video chat user interface 125 for display on the display 122.

Figure 2B:
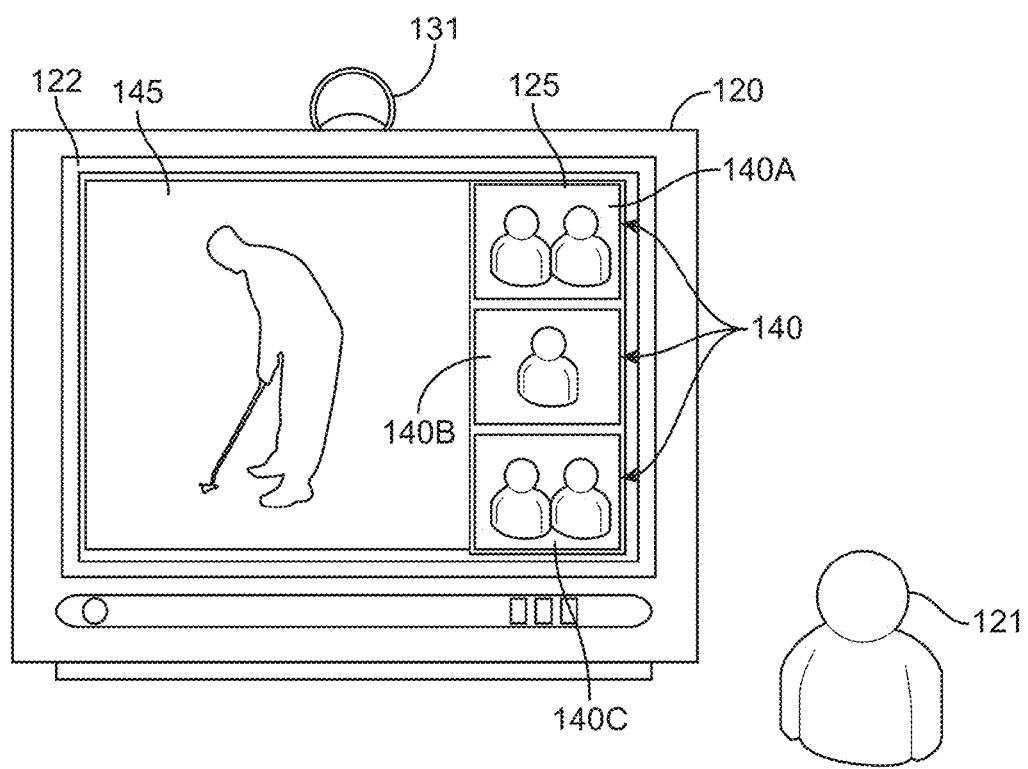
FIG. 2B illustrates an example user interface displayed on a client device participating in a group video chat, in accordance with an embodiment.

FIG. 2B illustrates an example video chat user interface 125 displayed on a client device 120, in accordance with an embodiment. The camera component 131 is configured to capture videos and/or images of one or more users 121 positioned in front of the camera component 131.

In one embodiment, the camera component 131 captures a video stream (i.e., one continuous video) of one or more users during playback of content on the client device 120. For example, as shown in FIG. 2B, the camera component 131 captures video and/or images of a user 121 watching a piece of content (e.g., a golf game) on the client device 120. As described in detail later herein, the system 100 analyzes the locally-captured video stream to determine the user's reaction to content playing on the client device 120.

A user 121 may participate in a group video chat while simultaneously watching content on the client device 120. As shown in FIG. 2B, the client device 120 is configured to simultaneously display content (e.g., the golf game) and a video chat user interface 125. The placement of the video chat user interface 125 relative to the content playing on the client device 120 may vary. In one example, the video chat user interface 125 is positioned in the foreground of the display 122 while the content plays in the background. In another example, the video chat user interface 125 is positioned in the background of the display 122 while the content plays in the foreground. In yet another example, the display 122 displays the content in a first window 145 and the video chat user interface 125 next to the first window 145, as shown in FIG. 2B.

The video chat user interface 125 displays a combined video stream received from the server unit 60. As stated above, a combined video stream includes a selected subset of video streams. In one embodiment, the server unit 60 selects which participating client devices 120 to include in the combined video stream. In another embodiment, the client device 120 selects which participating client devices 120 that the server unit 160 should include in the combined video stream.

The video chat user interface 125 includes one or more video chat windows 140. Each video chat window 140 displays a video stream captured by a different client device 120 participating in the group video chat. For example, as shown in FIG. 2B, the video chat user interface 125 displays a first video chat window 140A, a second video chat window 140B, and a third video chat window 140C. The number of video chat windows 140 displayed may be based on one of the following: the user's group chat settings and the capabilities of the client device 120. The number of client devices 120 participating in the group video chat may be more than the number of video chat windows 140 displayed on the display 122.

In one embodiment, the server unit 60 selects which participating client devices 120 to include in the combined video stream based on measurements of user activity at each client device 120. A measurement of user activity represents a degree of user interest in the content playing on a client device 120. User interest may be calculated locally at the client device 120 or remotely at the server unit 60.

Figure 3:
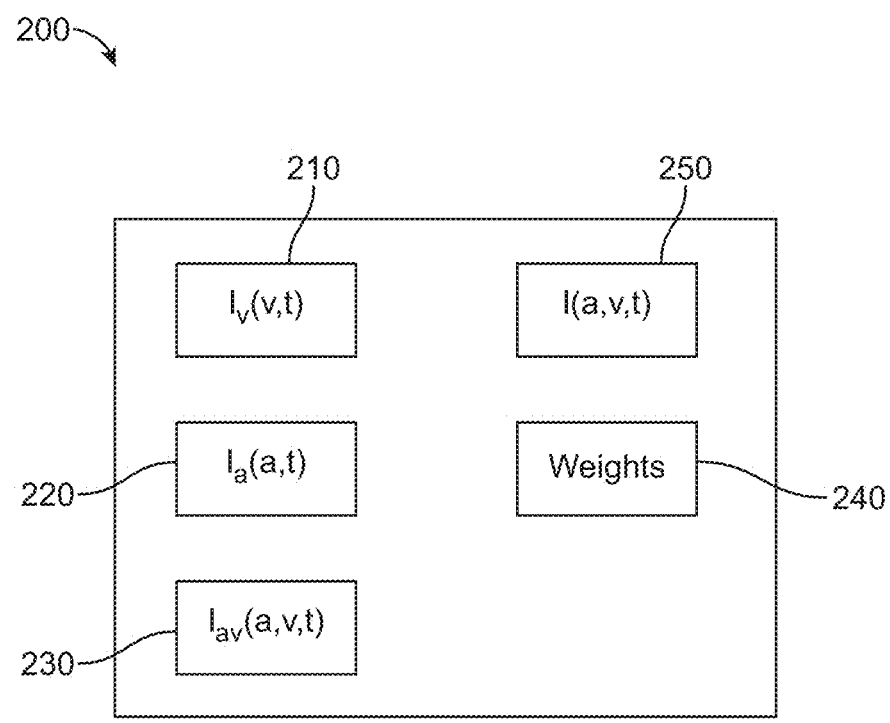
FIG. 3 illustrates a block diagram of a user interest measurement application module, in accordance with an embodiment.

FIG. 3 illustrates a block diagram of a user interest measurement application module 200, in accordance with an embodiment. Measuring user interest at a client device 120 depends on multiple variables, such as the video motion of the locally captured video stream, the audio volume of the locally captured video stream, and the correlation between the audio and video ("A/V correlation") of the locally captured video stream. In one embodiment, the user interest of a client device 120 is calculated using relation (1) below:

$$I(v,a,t) = c_v * I_v(v,t) + c_a * I_a(a,t) + c_{av} * I_{av}(a,v,t) \qquad (1),$$

wherein $I(v, a, t)$ is the user interest of a client device 120, $I_v(v, t)$ is the measured user interest based on video motion of the locally captured video stream, $I_a(a, t)$ is the measured user interest based on the audio of the locally captured video stream, $I_{av}(a, v, t)$ is the measured user interest based on the AV correlation of the locally captured video stream, $c_v$ is the weight constant for $I_v(v, t)$, $c_a$ is the weight constant for $I_a(a, t)$, and $c_{av}$ is the weight constant for $I_{av}(a, v, t)$.

The system 100 further comprises a user interest measurement application module 200. In one embodiment, the user interest measurement application module 200 resides on the server unit 60. In another embodiment, the user interest measurement application module 200 resides on a client device 120. The user interest measurement application module 200 comprises a video unit 210 for determining $I_v(v, t)$, an audio unit 220 for determining $I_a(a, t)$, an AV correlation unit 230 for determining $I_{av}(a, v, t)$, and a storage device 240 for maintaining weight constants $c_v$, $c_a$ and $c_{av}$, a user interest unit 250 for determining $I(a, v, t)$.

Figure 4:
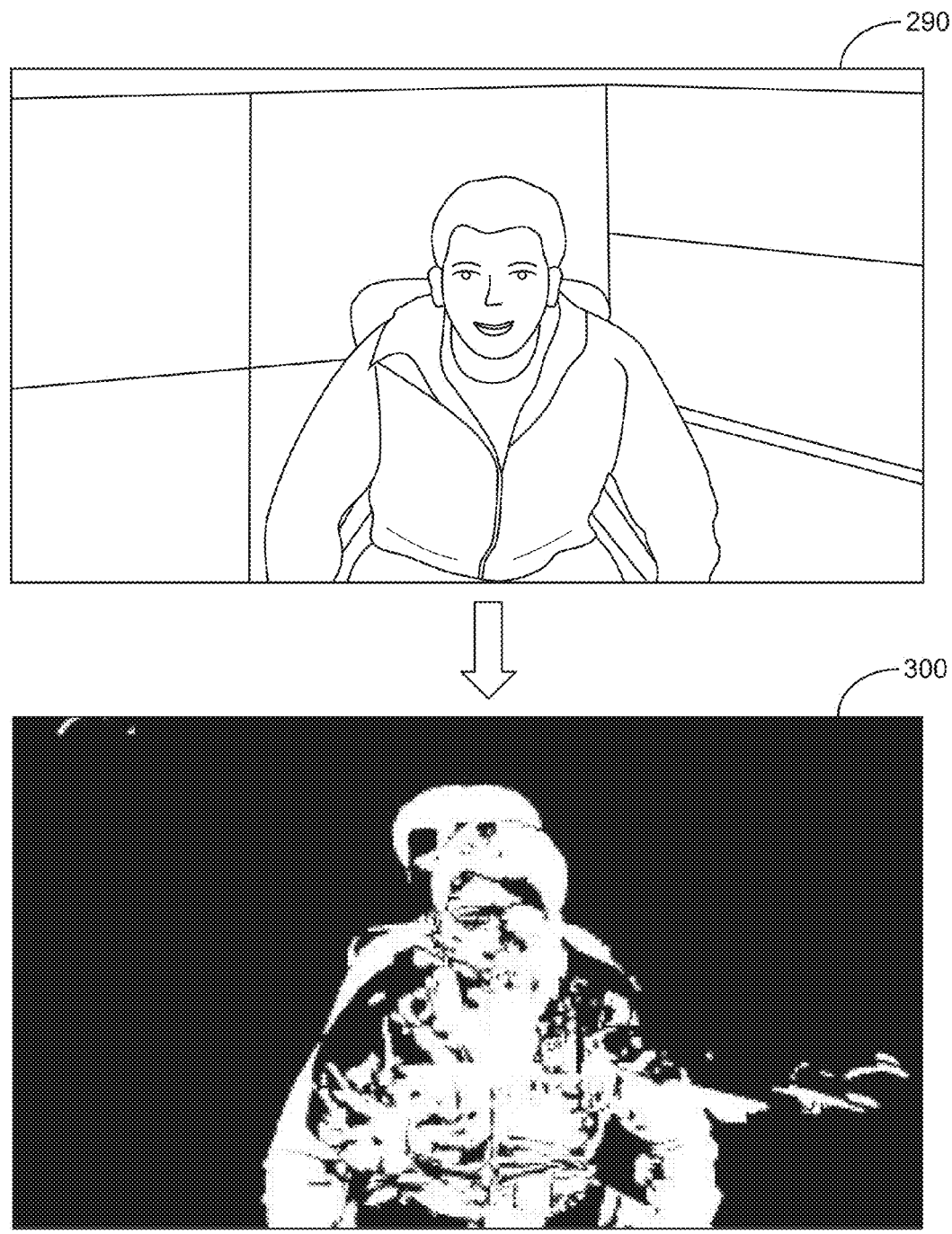
FIG. 4 illustrates motion detection processing of a video frame, in accordance with an embodiment.

FIG. 4 illustrates motion detection processing of a video frame 290, in accordance with an embodiment. The video unit 210 first processes each video frame 290 of a captured video stream using a motion detection algorithm, and generates a corresponding motion frame 300 for each video frame 290 processed. Each motion frame 300 highlights motion captured in a corresponding video frame 290.

In one embodiment, the motion detection algorithm models the background of the captured video stream and subtracts the background modeled from each video frame to detect "motion" in the video frame. Each video frame 290 is converted to grayscale, and the background model $m_0$ is initialized to a first video frame $f_0$ of the captured video stream. At each subsequent video frame $f_i$ of the captured video stream, the value of each background pixel $b_{xy}$ is moved towards a corresponding value $f_{i,xy}$ of the frame $f_i$ by 1 in accordance with relation (2) below:

$$b_{xy} = \begin{cases} b_{xy} + 1, & b_{xy} < f_{i,xy} \\ b_{xy} - 1, & b_{xy} > f_{i,xy} \\ b_{xy}, & b_{xy} = f_{i,xy}. \end{cases} \quad (2)$$

For each pixel $f_{i,xy}$ in the current frame $f_i$, the absolute difference between the value of a corresponding background pixel $b_{xy}$ and the value of the pixel $f_{i,xy}$ is calculated using relation (3) below:

$$d_{xy} = |b_{xy} - f_{i,xy}| \quad (3).$$

Let $m_{i,xy}$ represent the value of a pixel at coordinate (x, y) of an $i^{th}$ motion frame 300. The value of each pixel $m_{i,xy}$ is set in accordance with relation (4) below:

$$m_{i,xy} = \begin{cases} 1, & d_{xy} \geq T \\ 0, & d_{xy} < T, \end{cases} \quad (4)$$

wherein T represents a preset threshold value. If $d_{xy}$ is greater than or equal to the preset threshold value T, $m_{i,xy}$ is marked as a motion pixel (i.e., a moving pixel). If $d_{xy}$ is less than or equal to the preset threshold value T, $m_{i,xy}$ is marked as a non-motion pixel. The preset threshold value T may be used to eliminate noisy pixels.

As shown in FIG. 4, pixels of the motion frame 300 marked as motion pixels are represented in white, and pixels of the motion frame 300 marked as non-motion pixels are represented in black.

The video unit 210 then calculates metrics for each motion frame 300 generated. In one embodiment, the video unit 210 is configured to calculate the following metrics for an $i^{th}$ motion frame 300: a normalized average x position $x_{avg,i}$, a normalized average y position $y_{avg,i}$, and a normalized motion level $m_i$. The normalized average x position $x_{avg,i}$ is calculated using relation (5) below:

$$x_{avg,i} = \sum_{x=0,y=0}^{x=w-1,y=h-1} \frac{x \times m_{i,xy}}{w} \bigg/ \sum_{x=0,y=0}^{x=w-1,y=h-1} m_{i,xy}, \quad (5)$$

wherein w represents the resolution width of the captured video stream, and wherein h represents the resolution height of the captured video stream.

The normalized average y position $y_{avg,i}$ is calculated using relation (60) below:

$$y_{avg,i} = \sum_{x=0,y=0}^{x=w-1,y=h-1} \frac{y \times m_{i,xy}}{h} \bigg/ \sum_{x=0,y=0}^{x=w-1,y=h-1} m_{i,xy}. \quad (60)$$

The normalized motion level $m_i$ is calculated using relation (7) below:

$$m_i = \sum_{x=0,y=0}^{x=w-1,y=h-1} m_{i,xy} / w \times h. \quad (7)$$

Figure 5:
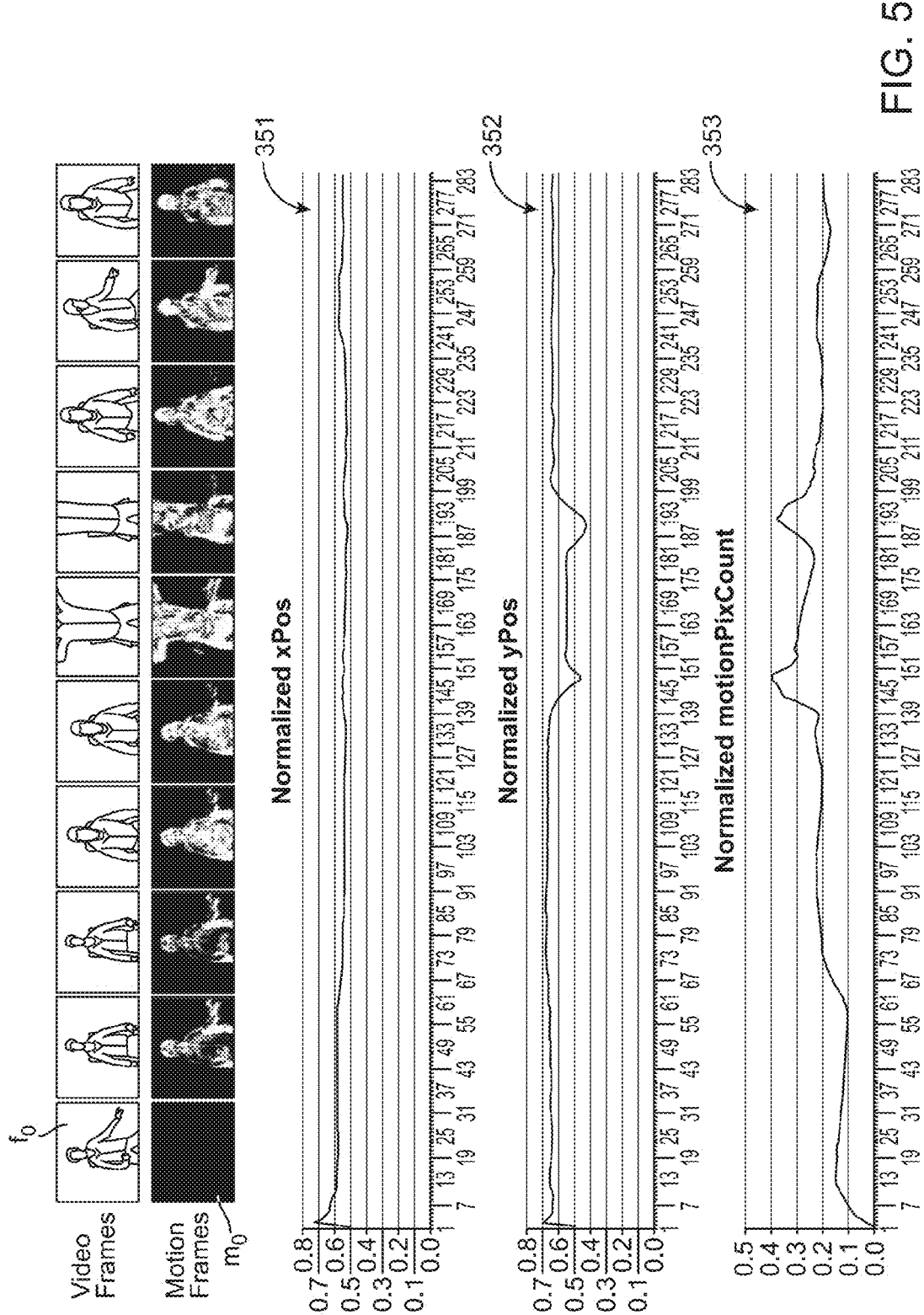
FIG. 5 illustrates graphs corresponding to the metrics calculated by the video unit, in accordance with an embodiment.

FIG. 5 illustrates graphs corresponding to the metrics calculated by the video unit 210, in accordance with an embodiment. The video unit 210 generates a graph over time (i.e., over video frame numbers) for each metric calculated. For example, as shown in FIG. 5, the video unit 210 generates a first graph 351 for the normalized average x position $x_{avg,i}$, a second graph 352 for the normalized average y position $y_{avg,i}$, and a third graph 353 for the normalized motion level $m_i$. FIG. 5 further illustrates every $30^{th}$ video frame 290 and the corresponding motion frame 300 for the captured video stream.

The video unit 210 is further configured to extract distinct graph patterns for distinct user actions from the graphs. For example, a graph pattern representing a user jumping up and down in front of the client device 120 may be different than a graph pattern representing a user who gets up and walks away from the client device 120.

Over time, the graph patterns extracted may be used to train a pattern recognition algorithm that is used to classify portions of the captured video stream into different classes of user action. For example, a portion of a captured video stream showing a user jumping up and down in front of the client device 120 may be classified differently from a portion of the captured video stream showing a user who gets up and walks away from the client device 120.

Interest weights may be assigned to different classes of user action. For example, the interest weight assigned to the user action of jumping up and down may be higher than the interest weight assigned to the user action of getting up and walking away. In one embodiment, $I_v(v, t)$ represents the sum of weighted user actions detected in the captured video stream.

Figure 6:
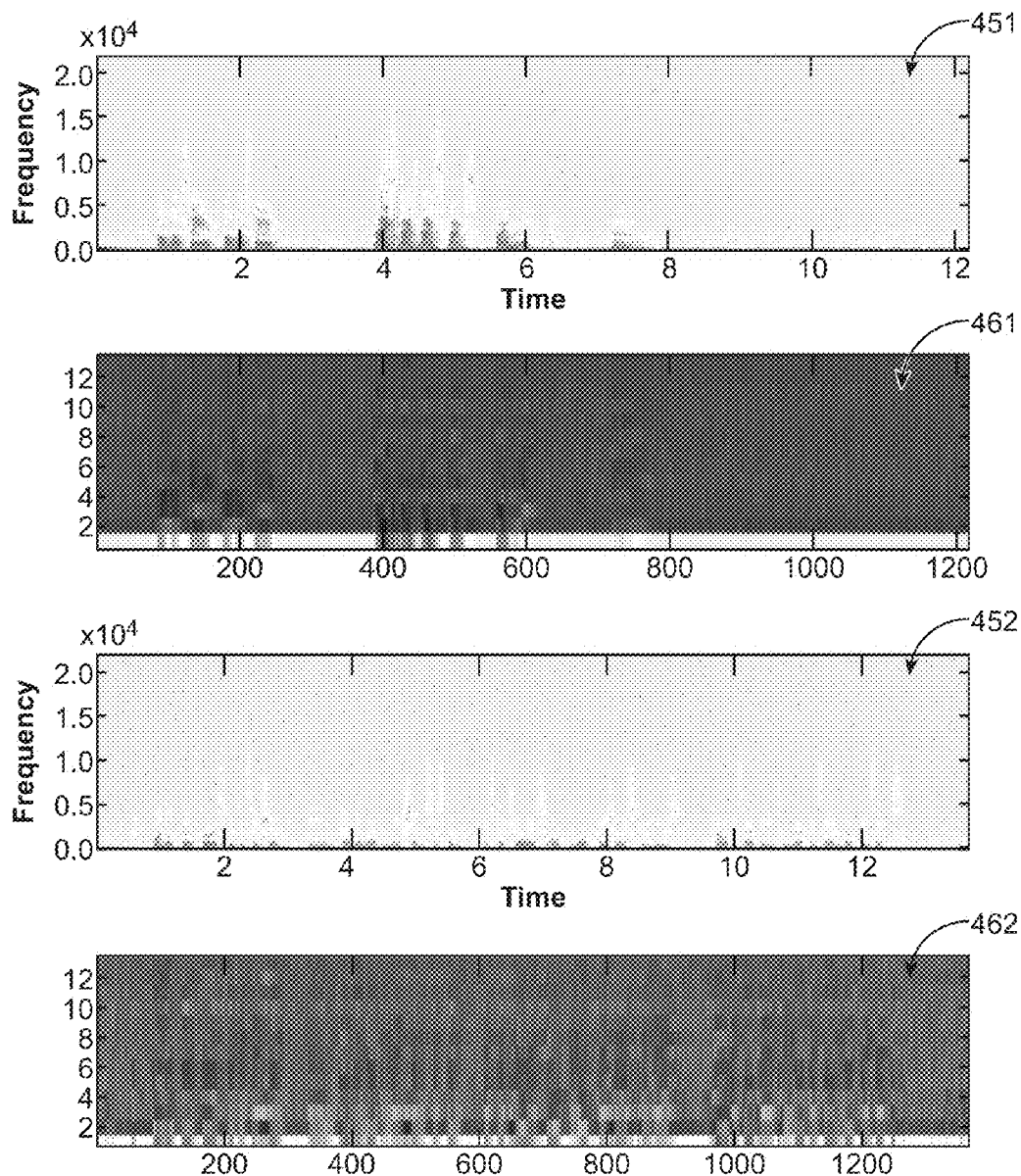
FIG. 6 illustrates example audio spectrums, in accordance with an embodiment.

FIG. 6 illustrates example audio spectrums, in accordance with an embodiment. In one embodiment, the audio unit 220 is configured to detect changes in volume or signal strengths over time in the audio of the captured video stream.

For example, FIG. 6 shows a first frequency spectrum 451 for a first piece of audio that includes occasional cheering and commenting from users, and a second frequency spectrum 452 for a second piece of audio including mostly background talking. The frequency of audio significantly changes when an event indicating user interest, such as cheering or loud user comments, occurs. The differences between adjacent time slots of the frequency spectrum (e.g., 0.5 seconds) may be used as $I_a(a, t)$.

In another embodiment, the audio unit 220 is configured to detect Mel-frequency cepstral coefficients (MFCCs) for the audio of the captured video stream. FIG. 6 further shows a first representation 461 of MFCC values corresponding to the first frequency spectrum 451, and a second representation 462 of MFCC values corresponding to the second frequency spectrum 452. MFCC values are higher when an event indicating user interest, such as cheering or loud user comments, occurs. Normalized MFCC values may be used as $I_a(a, t)$.

The A/V correlation unit 230 is configured to receive $I_v(v, t)$ and $I_a(a, t)$ from the video unit 210 and the audio unit 220, respectively. In one embodiment, the A/V correlation unit 230 calculates $I_{av}(a, v, t)$ using relation (8) below:

$$I_{av}(a, v, t) = \begin{cases} 1, & \text{if } I_v(v, t) > \alpha \text{ and } I_a(a, t) > \beta \\ 0, & \text{otherwise,} \end{cases} \quad (8)$$

where $\alpha$ and $\beta$ are thresholds for $I_v(v, t)$ and $I_a(a, t)$, respectively.

In another embodiment, the A/V correlation unit 230 may account for a phase difference between audio and video. In this specification, let $T_p$ and $T_f$ represent a look behind and a look ahead period, respectively. Let $I_{v,max}(v, t)$ represent the maximum value of $I_v(v, t)$ over the range $[t-T_p, t+T_f]$ and let $I_{a,max}(a, t)$ represented the maximum value of $I_a(a, t)$ over the $[t-T_p, t+T_f]$ range. The A/V correlation unit 230 calculates $I_{av}(a, v, t)$ using relation (9) below:

$$I_{av}(a, v, t) = \begin{cases} 1, & \text{if } I_v(v, t) > \alpha \text{ and } I_{a,max}(a, t) > \beta \\ 1, & \text{if } I_{v,max}(v, t) > \alpha \text{ and } I_a(a, t) > \beta \\ 0, & \text{otherwise.} \end{cases} \quad (9)$$

Figure 7:
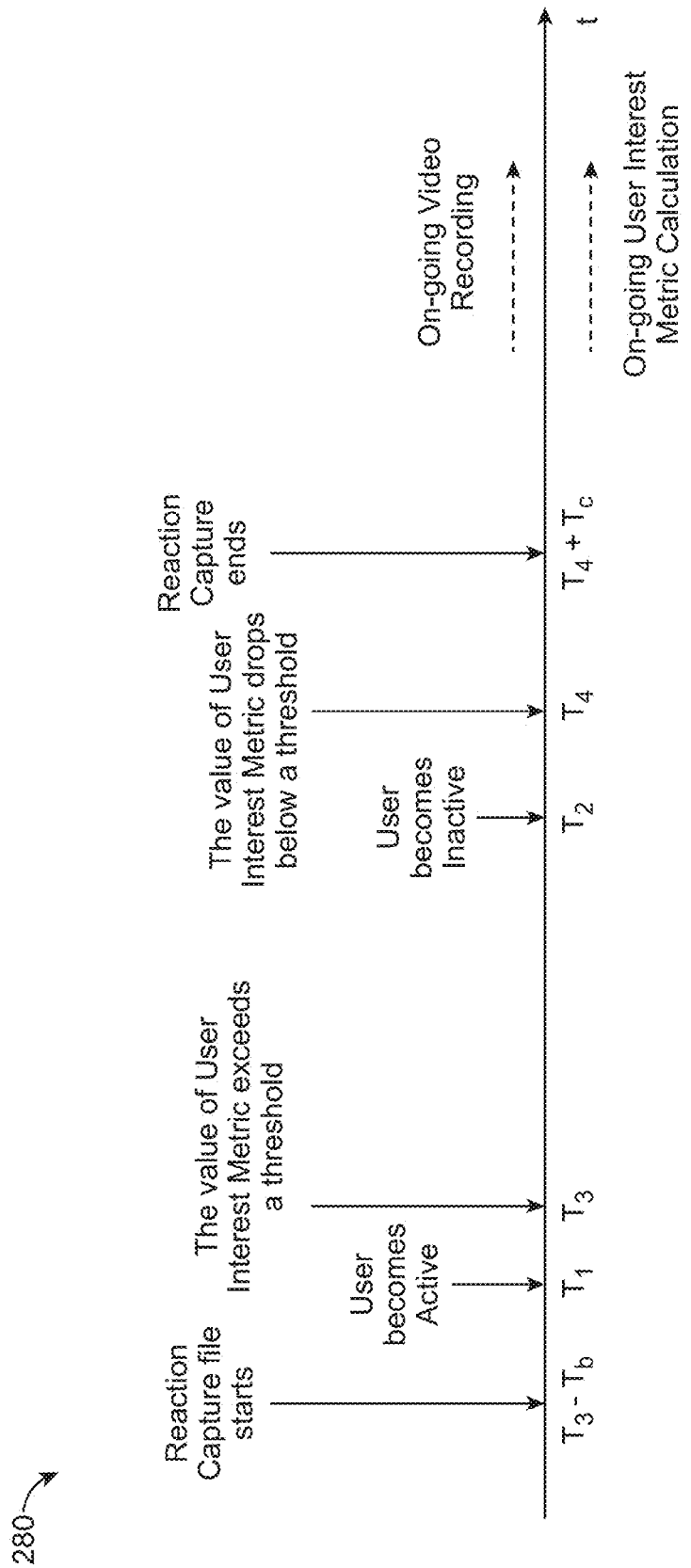
FIG. 7 is a timeline illustrating the capture of a user reaction, in accordance with an embodiment.

FIG. 7 is a timeline 280 illustrating the capture of a user reaction, in accordance with an embodiment. The reaction capture application module 260 is configured to record an ongoing user reaction using in-memory buffering.

Specifically, to classify portions of the captured video stream into different classes of user action, the video unit 210 references a previous set of video frames 290. As such, the earliest the user interest measurement application module 200 can determine $I(v, a, t)$ is at time $t+T_p$, wherein $T_p$ represents the duration of a detected user action.

To eliminate or minimize video delay, the reaction capture application module 260 maintains a video buffer in the memory unit 135, wherein the duration of video maintained in the video buffer $T_b$ is greater than $T_p$. The video buffer maintained potentially includes a portion of the captured video stream that shows a user reaction. After the start and end time of a user reaction is determined, the reaction capture application module 260 cleans up the video buffer, and continues to save another portion of the ongoing video stream.

For example, as shown in FIG. 7, a user is active between time $T_1$ and time $T_2$ of the timeline 280. User interest $I(v, a, t)$ of a piece of content playing on the client device 120 varies over time. At time $T_3=T_1+T_p$, the user interest $I(v, a, T_1)$ is calculated and a user reaction is detected. The reaction capture application module 260 maintains video from time $T_3-T_b$ onwards, and begins recording the rest of the captured video stream. At time $T_2$ the user is no longer active. At time $T_4=T_2+T_p$, the user interest $I(v, a, T_2)$ is calculated at. Duration $T_c$ represents the ending portion of a user reaction. The reaction capture application module 260 records the video from time $T_3-T_b$ to time $T_4+T_c$, thereby ensuring that the entire user reaction is captured. The video of the user reaction may be sent to the server unit 60 or posted to a social networking site.

In one embodiment, user reactions may be pre-recorded and used as an extra indicator to detect a user reaction. By maintaining videos of different user reactions (cheering, laughing, bouncing, hand clapping, etc.), the system 100 can calculate the user interest value for the videos and use the videos as templates.

In one embodiment, the system 100 may utilize inputs from external resources. For example, when a soccer game is playing on a client device 120, the start time of user reaction is usually close to a scoring event in the soccer game. The system 100 can obtain information relating to scores of the soccer game, and determine increased user interest when the score changes. Other resources may be used, such as resources relating to crowd sourcing (e.g., comments posted to Twitter® during the soccer game), and commentary from sports broadcasters, etc.

When there are multiple clients in the system 100, the server unit 60 can collect the values of user interest from different client devices 120 over time. If a large percentage of client devices 120 start to provide high user interest values, the system 100 may determine that an event of interest is occurring and send recording command to all the client devices 120.

Figure 8:
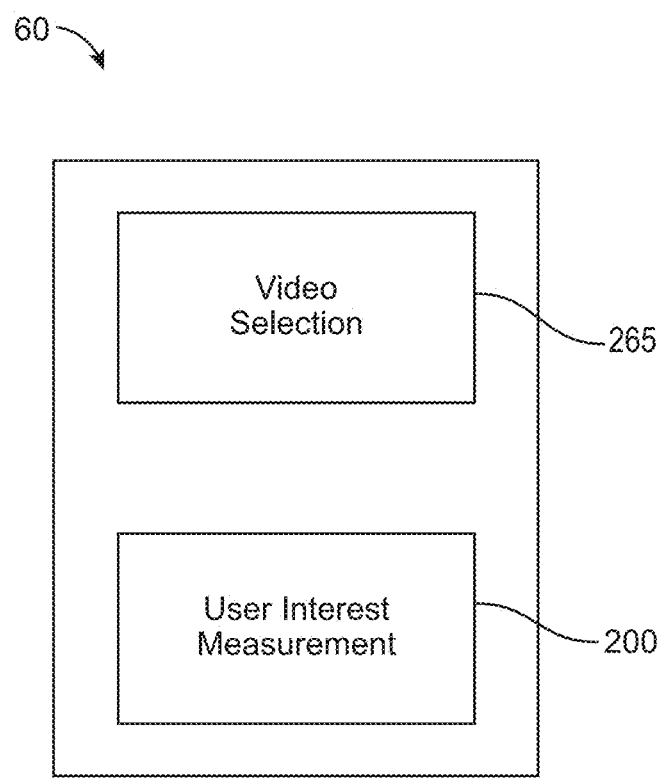
FIG. 8 illustrates a block diagram of a server unit, in accordance with an embodiment.

FIG. 8 illustrates a block diagram of a server unit 60, in accordance with an embodiment. In one embodiment, the server unit 60 comprises a video selection application module 265. The video selection application module 265 receives a video stream from each client device 120 participating in a group video chat. The video selection application module 265 selects a subset of participants based on the measurements of user interest determined by the user interest measurement application module 200, and composes a combined video stream including the video streams of the selected subset of participants.

In one embodiment, the video selection application module 265 also receives from each participating client device 120 a metric representing user interest $I(a, v, t)$. In another embodiment, the server unit 60 further comprises a user interest measurement application module 200 for calculating user interest $I(a, v, t)$ for each participating client device 120. The video selection application module 265 may select the most active participants based on the user interest metrics received.

In one embodiment, the combined video stream is sent to all participating client devices 120. In another embodiment, the video selection application module 265 sends a different combined video stream to a participating client device 120 on the preferences of the client participating device 120. For example, the video selection application module 265 may also receive from each participating client device 120 a list of preferred users that the participating client device 120 wants to video chat with. The video selection application module 265 may select which participants to include in the combined video stream based on the user interest metrics and the list of preferred users received.

In one embodiment, to conserve networking resources, each participating client device 120 first sends the calculated user interest metric to the server unit 60. The server unit 60 then requests a video stream from a participating client device 120 only if the participating client device 120 is selected.

A client device 120 can set user preferences indicating which participating clients should be included in the video chat windows available, thereby leaving the remaining chat windows, if any, to other participating clients with the highest user interest values.

In one embodiment, the system 100 allows for each participating client device 120 to vote for which participant to include in the combined video stream.

In one embodiment, the server unit 60 re-selects participants after a particular duration of time has elapsed (e.g., 10 seconds).

Figure 9:
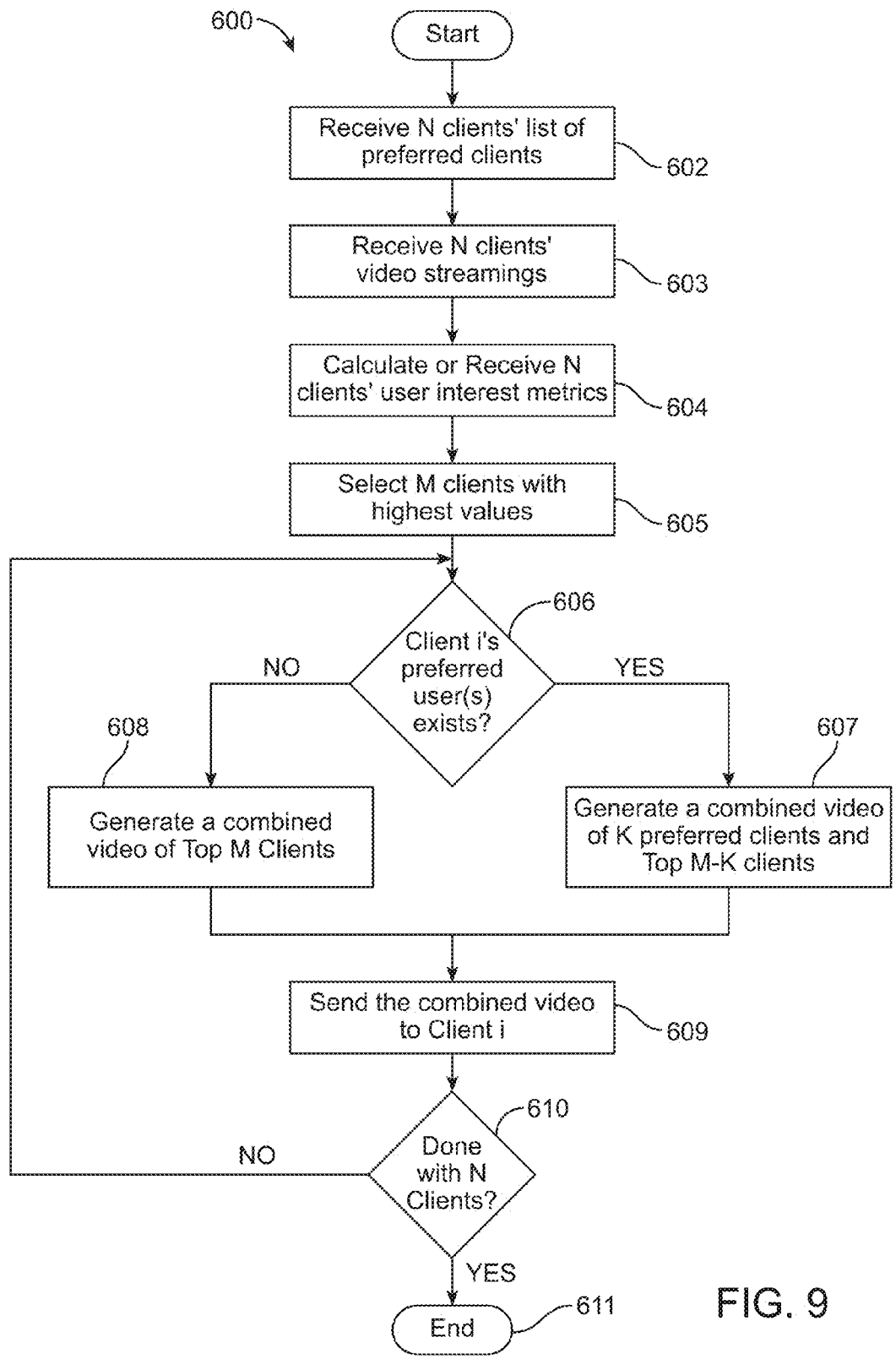
FIG. 9 illustrates an example flow chart for selecting video streams to include in a combined video stream, in accordance with an embodiment.

FIG. 9 illustrates an example flow chart 600 for selecting video streams to include in a combined video stream, in accordance with an embodiment. In process block 601, the process starts. In process block 602, a list of preferred clients is received from each of the N participating clients. In process block 603, a video stream of the client is received from each participating client. In process block 604, a metric representing the client's user interest in the content playing on the client's client device is calculated or received from each participating client. In process block 605, M clients with the highest values for user interest is selected. In process block 606, for a participating client, whether any of the client's preferred clients is a participating client is determined. If any of the preferred clients is a participating client, then proceed to process block 607 to generate a combined video stream for the participating client that includes K preferred clients and the top M-K clients with the highest values of user interest. If not, proceed to process block 608 to generate a combined video stream for the participating client that includes the top M clients with the highest values of user interest. In process block 609, the combined video stream is sent to the participating client. In process block 610, whether there are any remaining participating clients that have not yet received a combined video stream is determined. If there are remaining participating clients, then return to process block 606. If not, proceed to process block 611 where the process ends.

Figure 10:
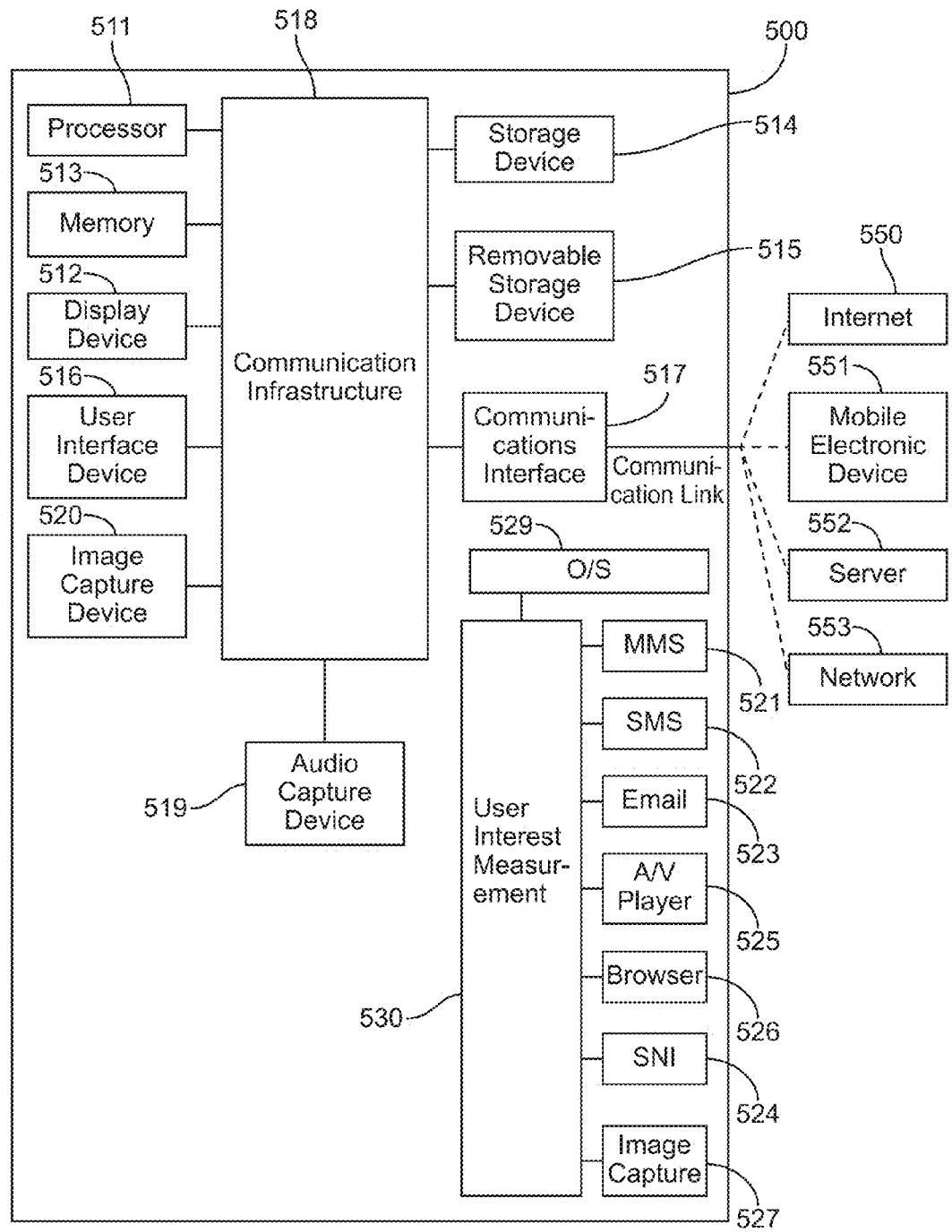
FIG. 10 is a high-level block diagram showing an information processing system comprising a computing system implementing an embodiment.

FIG. 10 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices and/or networks, such as the Internet 550, a mobile electronic device 551, a server 552, and a network 553. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

The system 500 further includes an image capture device 520 such as a camera 131 and an audio capture device 519 such as a microphone 132. The system 500 may further include application modules as MMS module 521, SMS module 522, email module 523, social network interface (SNI) module 524, audio/video (AV) player 525, web browser 526, image capture module 527, etc.

The system 500 further includes a user engagement module 530 for measuring user engagement of content as described herein, according to an embodiment. In one embodiment, the user engagement module 530 along with an operating system 529 may be implemented as executable code residing in a memory of the system 500. In another embodiment, the user engagement module 530 along with the operating system 529 may be implemented in firmware.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though one or more embodiments has been described with reference to certain versions thereof; however, other versions are possible. Therefore, the spirit and scope of the appended claims should not be limited to the description of the preferred versions contained herein.

What is claimed is:

1. A system for facilitating a video chat session between multiple client devices, the system comprising:
   at least one processor; and
   a non-transitory processor-readable memory device storing instructions that when executed by the at least one processor causes the at least one processor to perform operations including:
      receiving information units from the multiple client devices, wherein each information unit represents activity, at a client device of the multiple client devices, at least partially overlapping in duration with playback of a piece of content on the client device;
      selecting a subset of information units from the information units received based on measurements of activity in the information units received; and
      generating a combined video stream including the selected subset of information units, wherein the combined video stream is sent to at least one client device of the multiple client devices for display at least partially overlapping in duration with the piece of content on the at least one client device.

2. The system of claim 1, wherein:
   each measurement of activity represents a degree of interest at a client device of the multiple client devices; and
   each information unit received from each client device comprises a video stream capturing activity at the client device.

3. The system of claim 2, wherein the operations further include:
   receiving, from each client device, preferences for the client device, selecting at least one information unit from the information units received based on the preferences for the client device, and generating a combined video stream including the at least one information unit selected for the client device.

4. The system of claim 2, wherein the operations further include:
   for each video stream received, determining a measurement of activity captured in the video stream.

5. The system of claim 2, wherein the operations further include:
   receiving, from each client device, a measurement of activity captured at the client device.

6. The system of claim 2, wherein:
   the selected subset of information units include a video stream with highest measurement of activity among the information units received.

7. The system of claim 1, wherein:
   each information unit further represents user activity captured at a client device of the multiple client devices during playback of a piece of content on the client device; and
   the combined video stream is sent to at least one client device of the multiple client devices for simultaneous display with the piece of content on the at least one client device.

8. A method for facilitating a video chat session between multiple client devices, the method comprising:
   receiving information units from the multiple client devices, wherein each information unit represents activity, at a client device of the multiple client devices, at least partially overlapping in duration with playback of a piece of content on the client device;
   selecting a subset of information units from the information units received based on measurements of activity in the information units received; and
   generating a combined video stream including the selected subset of information units, wherein the combined video stream is sent to at least one client device of the multiple client devices for display at least partially overlapping in duration with the piece of content on the at least one client device.

9. The method of claim 8, wherein:
   each measurement of activity represents a degree of interest at a client device of the multiple client devices that is determined based on activity at the client device;
   each information unit received from each client device comprises a video stream capturing activity at the client device; and
   the selected subset of information units include a video stream with highest measurement of activity among the information units received.

10. The method of claim 9, further comprising:
    sending the combined video stream to each client device.

11. The method of claim 9, further comprising:
    for each client device:
       receiving preferences for the client device;
       selecting at least one information unit from the information units received based on the preferences for the client device; and
       generating a combined video stream including the at least one information unit selected for the client device.

12. The method of claim 9, further comprising:
    for each video stream received, determining a measurement of activity captured in the video stream.

13. The method of claim 9, further comprising:
    receiving, from each client device, a measurement of activity captured at the client device.

14. A non-transitory computer-readable medium storing instructions that, when executed by at least one processor of a machine, cause the machine to perform operations comprising:
 receiving information units from the multiple client devices, wherein each information unit represents activity, at a client device of the multiple client devices, at least partially overlapping in duration with playback of a piece of content on the client device;
 selecting a subset of information units from the information units received based on measurements of activity in the information units received; and
 generating a combined video stream including the selected subset of information units, wherein the combined video stream is sent to at least one client device of the multiple client devices for display at least partially overlapping in duration with the piece of content on the at least one client device.

15. The non-transitory computer-readable medium of claim 14, wherein:
 each measurement of activity represents a degree of interest at a client device of the multiple client devices that is determined based on activity at the client device;
 each information unit received from each client device comprises a video stream capturing activity at the client device; and
 the selected subset of information units include a video stream with highest measurement of activity among the information units received.

16. The non-transitory computer-readable of claim 15, the method further comprising:
 for each client device:
  receiving preferences for the client device;
  selecting at least one information unit from the information units received based on the preferences for the client device; and
  generating a combined video stream including the at least one information unit selected for the client device.

17. The non-transitory computer-readable medium of claim 15, the method further comprising:
 for each video stream received, determining a measurement of activity captured in the video stream.

18. The non-transitory computer-readable medium of claim 15, the method further comprising:
 receiving, from each client device, a measurement of activity captured at the client device.

19. An electronic device for facilitating a video chat session, comprising:
 a display;
 a camera;
 at least one processor; and
 a non-transitory processor-readable memory device storing instructions that when executed by the at least one processor causes the at least one processor to perform operations including:
  capturing a video stream of activity at the electronic device during playback of a piece of content on the display;
  receiving a combined video stream including at least one video stream of activity captured at a different electronic device;
  generating a graphical user interface (GUI) comprising at least one video chat window, wherein each video chat window corresponds to a video stream included in the combined video stream, and the chat window includes a video stream of activity captured at a different electronic device; and
  simultaneously displaying the piece of content and the GUI generated on the display.

20. The electronic device of claim 19, wherein:
 the electronic device receives the combined video stream from a server; and
 the electronic device sends the video stream of activity captured at the electronic device to the server.

21. The electronic device of claim 20, wherein the operations further include:
 measuring interest in the piece of content based on a measurement of activity captured at the electronic device, wherein the electronic device sends data relating to the measured interest to the server.

22. The electronic device of claim 20, wherein the operations further include:
 detecting and recording a reaction at the electronic device during the playback of the piece of content on the display.

23. The electronic device of claim 22, wherein:
 the recorded reaction is sent to at least one of the server and a social networking site.

24. The electronic device of claim 20, wherein:
 the electronic device sends preferences to the server; and
 the combined video stream received from the server is based in part on the preferences.

25. A graphical user interface (GUI) displayed on a display device, comprising:
 a first window for displaying a piece of content; and
 a video chat interface for facilitating a video chat session with one or more other devices during playback of the piece of content, the video chat interface comprising at least one video chat window, each video chat window corresponding to a video stream included in a combined video stream received at the display device, and each chat window including a video stream of activity, at an other device of the one or more other devices, at least partially overlapping in duration with playback of the piece of content on the other device;
 wherein the GUI simultaneously displays the piece of content and the video chat interface on the display device.

26. The GUI of claim 25, wherein:
 the number of video chat windows included in the video chat interface is based on preferences.

27. The GUI of claim 25, wherein:
 the number of video chat windows included in the video chat interface is based on capabilities of the display device.

* * * * *